Nov. 24, 1925.   1,562,917
O. RICHTER
METHOD OF AND MEANS FOR INCREASING THE TURNING MOMENT IN INDICATING DEVICES
Filed March 11, 1925    2 Sheets-Sheet 1
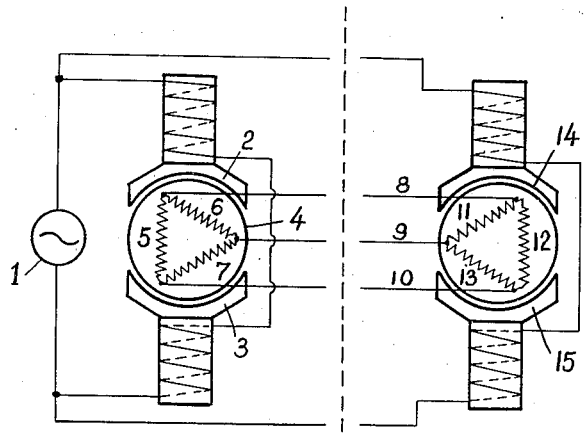
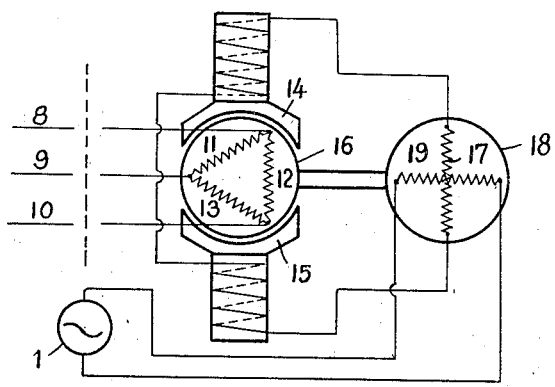
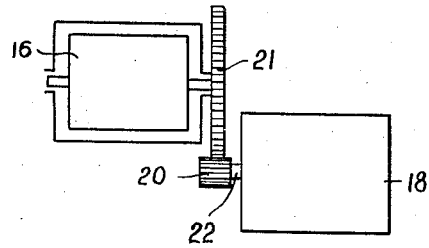
INVENTOR
Oskar Richter
BY
ATTORNEYS

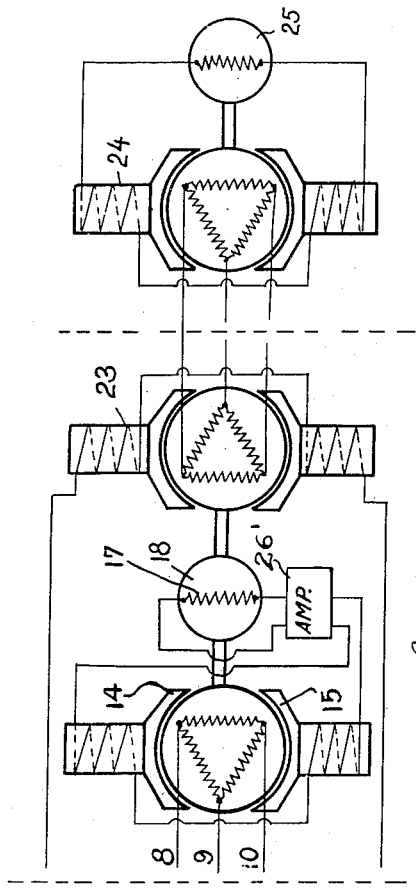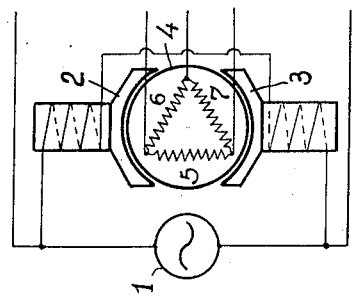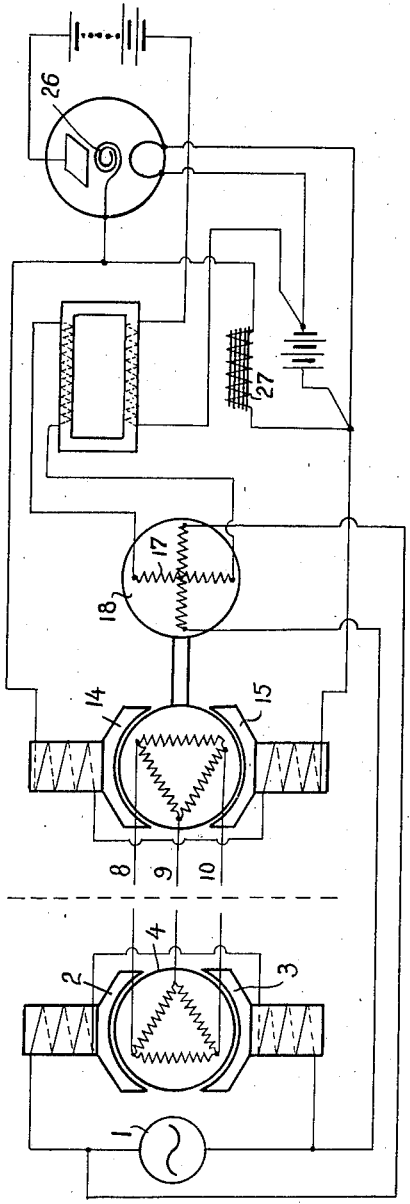

Patented Nov. 24, 1925.

1,562,917

UNITED STATES PATENT OFFICE.

OSKAR RICHTER, OF NEUMUHLEN, NEAR KIEL, GERMANY, ASSIGNOR TO ANSCHÜTZ & CO., OF NEUMUHLEN, NEAR KIEL, GERMANY.

METHOD OF AND MEANS FOR INCREASING THE TURNING MOMENT IN INDICATING DEVICES.

Application filed March 11, 1925. Serial No. 14.846.

*To all whom it may concern:*

Be it known that I, OSKAR RICHTER, residing at Neumuhlen, near Kiel, Germany, Heikendorferweg 9, have invented certain new and useful Improvements in Methods of and Means for Increasing the Turning Moment in Indicating Devices, for which I have filed application in Germany, March 3, 1924, of which the following is a specification.

My invention relates to an improved method of and means for increasing the turning moment or torque in electric indicating devices.

It has been suggested heretofore to provide the receiver of an electric indicating device with a source of power in the form of a motor adapted to operate in the manner of a relay to set the revolving receiving member in the transmitter in accordance with the weak currents flowing through the long-distance line. My invention is based upon this principle and the object of my invention is to provide in an electric indicating device of the rotating field type a receiver of comparatively small dimensions but of higher effective power than hitherto practised without essentially increasing the working current and without dispensing with the valuable advantages of this system or principle.

With this aim in view I provide, in connection with the receiver an outer source of power, preferably in the form of a small two-phase motor adapted to act or operate in the manner of a relay, but having no point of interruption of current and not even any sliding brushes.

Fig. 1 illustrates a system wherein the power supply for the receiving apparatus is derived from the transmitter;

Fig. 2 is a modification wherein an auxiliary induction motor is used to augment the power supply of the receiver motor;

Fig. 3 shows the use of reduction gears between the induction and receiver motors;

Figs. 4 and 5 are modifications showing the use of amplifiers.

Before proceeding to describe the specific construction and arrangement of my improved device I shall now describe the system or diagram of connections shown in Figure 1 of the accompanying drawings forming a part of this specification.

Figure 1 illustrates an indicating device of the rotating field type which is known in itself. 1 designates a source of alternating current, 2 and 3 denote the pole shoes of a stator with the usual windings supplied with current from the source 1 of alternating current. 4 is the rotor with its coils 5, 6 and 7 in which currents are induced and adapted to be transmitted to the coils 11, 12 and 13 of a second rotor 16 by means of the long distance lines 8, 9 and 10. The stator with its pole shoes 14 and 15 co-operating with the rotor 16 is energized by the same source 1 of alternating current. The rotor 4 with its co-operating parts forms the transmitter and the rotor 16 with its co-operating parts represents the receiver. The latter adjusts itself in a manner that the currents induced in the coils 11, 12 and 13 by the field of the co-operating stator will balance the currents arriving from the transmitter, so that upon setting there will not flow any current in the conductors 8, 9 and 10. If, however, the transmitter is turned or displaced whilst the movable system 16 of the receiver still is at rest, currents will flow in the conductors 8, 9 and 10 and these currents will impart to the armature 16 the required setting force.

In case the distance between the transmitter and the receiver is very great so that the conductors 8, 9 and 10 represent a high resistance, the currents and consequently the setting force will be considerably reduced.

According to my invention this defect is remedied in the manner illustrated in Figure 2 wherein the winding of the stator 14, 15 of the receiver is not energized by the source 1 of current of the transmitter or any equivalent source of current, but is closed across a phase 17 of a two-phase induction motor 18, preferably of a multipolar structure, which is mechanically connected to the rotor of the receiving device. The other phase 19 is constantly enclosed in the circuit of the source 1 of alternating current or any equivalent source of electric energy. The winding of the stator constitutes the secondary of a transformer having the primary 11, 12, 13.

The mechanical connection between the rotor 16 of the receiver and the two-phase motor 18 is diagrammatically shown in Figure 3. As will be clearly seen a pinion 20 is keyed to the shaft 22 of the motor 16 and arranged to mesh with a spur gear 21 keyed to the shaft of the rotor 16 of the receiver in order to bring about a transmission from a higher to a lower speed. In most cases, however, a considerably higher ratio of gearing will have to be employed than that shown in Figure 3, and preferably a worm gear will be used for the purpose instead of the spur gear system illustrated in Figure 3.

If the two rotors of the transmitter and the receiver adopt different positions, the currents flowing in the conductors 8, 9 and 10 will produce a rotating field in the rotor 16 (the latter being retarded by the mechanical transmission 20, 21), due to the action of the windings 11, 12 and 13, the said rotating field acting in turn to generate in the windings of the pole-pieces 14 and 15 an alternating current the phase of which will be displaced in the one or the other direction just in accordance with the direction of rotation of the rotating field. As the thus generated current is conducted to the winding 17 of the two-phase induction motor 18, the latter will start and act to displace the rotor 16 in the one or the other direction until the rotating field of the armature 16 will be like zero and the current in the coil 17 necessarily disappears simultaneously therewith. The current in coil 17 drops to zero because the sum of the currents in the various coils 11, 12 and 13 becomes zero when the armature reaches the synchronous position and accordingly no current is induced in the windings of the pole pieces 14 and 15. The motor 18 comes to rest as soon as the current stops flowing in the winding 17. This invariably happens where the motor 18 is of the two-phase asynchronous type having considerable slip; if the motor does not have a considerable slip, it will either stop or cause the rotor 16 to have an insignificant oscillatory movement about its synchronous position.

The windings 17 of the motor 18 may be considered as a means responsive to the phase of the alternating current induced in the coils on pole pieces 14 and 15. If the phase be equal to that of the current in winding 19, there will be no rotation of the rotor 16; on the other hand, if there be a lead or lag of phase, the motor will revolve one way or the other, and this will continue until the receiver armature 16 rotates into a position which causes the phase of the current in winding 17 to be the same as that of the current in winding 19.

Referring again to Figure 2, the rotor of the receiver follows the movements of the rotor of the transmitter in exactly the same manner as in Figure 1. The difference mainly resides in the provision of the particular mechanical connection shown in Figure 3 and possessing a high ratio of gearing so that almost any desired degree or multiplicity of efficiency may be obtained, but of course at the cost of the setting time which, if larger angles are to be indicated, will attain measurable values in case of the construction shown in Figures 2 and 3 as compared with that illustrated in Figure 1. In most cases, however, the short length of time required or spent is irrelevant, especially if the angular positions in the transmitter continuously change as in water-gauges, instruments for the indication of the position of a rudder, instruments for transmitting compass indications and the like.

The inventive idea is also applicable in connection with electric indicating devices equipped with alternating fields adapted to produce phase displacements in both directions of rotation.

As according to my invention the shaft of the receiver rotor 16 is driven by an outer source of power or motor, the latter may be utilized at the same time to perform some other work, besides the actuation of the indicator; thus the same may be used, for example, for controlling starting resistances or regulating resistances of large electric motors.

A further increase of the energy available in the receiver will be ensured by the modication shown in Figure 4, wherein the shaft of the motor 18, instead of directly actuating the apparatus or masses to be set at a distance, will act to displace a second transmitter 23 of heavy construction and adapted to act in turn to influence a second receiver 24 and a correspondingly strong motor 25, which may be considered as a cascade arrangement. In the two motors 18 and 25 corresponding to the motor 18 in Figure 3 the second winding to be energized by a source of alternating current is not shown. The energy available in the receiver may be further increased by providing an amplifier 26'; the purpose of this amplifier is to increase the current supplied to the winding 17 of the motor 18. One form of the amplifier 26' is shown more in detail in Figure 5.

In Figure 5, I have illustrated an amplifier comprising one or more amplifying tubes. In this system the current induced in the coils 14 and 15 does not flow direct into the coil 17 of the two-phase induction motor 18, but such current will be conducted in a known manner to the grid of an amplifying tube 26, while the anode current will feed the subsidiary phase 17 of the motor 18 either direct or through a transformer as shown. A preliminary transformer for the grid current is dispensable under certain circumstances provided that the windings of the coils 14 and 15 are dimensioned so as to accomplish at the same time the function of a preliminary transformer. The connections as shown in Figure 5 afford a way in which very weak currents in the conductors 8, 9 and 10 will ensure the desired result even in case of very long distance conduits, and in which the described system may be developed for use in wireless transmission.

It is obvious that changes might be resorted to in the form and arrangement of the several parts constituting the various embodiments of my invention without departing from the spirit and scope thereof; hence I do not wish to limit myself strictly to the structures herein shown and described, but what I claim is:—

1. A device of the type described, comprising a stator, a rotor, windings for said rotor and stator, one of said windings having currents induced therein in accordance with the position of the rotor with respect to the stator; and a source of power inductively responsive to the said induced currents.

2. An indicating device of the character set forth, comprising a stator, a rotor, windings for said stator and rotor, respectively, and an induction motor connected to said rotor and having a coil electrically connected with the stator winding, the arrangement being such that alternating current is induced in the stator winding and conducted to the said coil of the said motor whereby the motor acts to turn the said rotor.

3. A device of the type described, comprising a source of alternating current, a transmitter connected to said source, a receiver including a stator, a rotor electrically connected to said transmitter, windings for said stator and rotor, an induction motor connected to said rotor, a coil on said motor connected to the winding of said stator and a second coil on said motor connected to said source of alternating current.

4. An indicating device of the character set forth, comprising a receiver including a stator, a rotor, windings for said stator and rotor, respectively, an induction motor having a coil electrically connected with the stator winding, and speed reduction means connecting the said motor to said rotor.

5. An indicating device of the character set forth, comprising a receiver including a stator, a rotor, windings for said stator and rotor, respectively, an induction motor connected to said rotor and having a coil connected with the winding of said stator, a transmitter connected to said receiver, a second receiver and a motor connected to said second receiver and to said transmitter for actuating the said transmitter.

6. An indicating device of the character set forth, comprising a receiver including a stator, a rotor, windings for said stator and rotor, respectively, the stator winding having currents induced therein, an induction motor having a coil connected with the stator winding, and means for amplifying the currents induced in said stator winding.

In testimony whereof I have affixed my signature.

OSKAR RICHTER.